Figure 1:
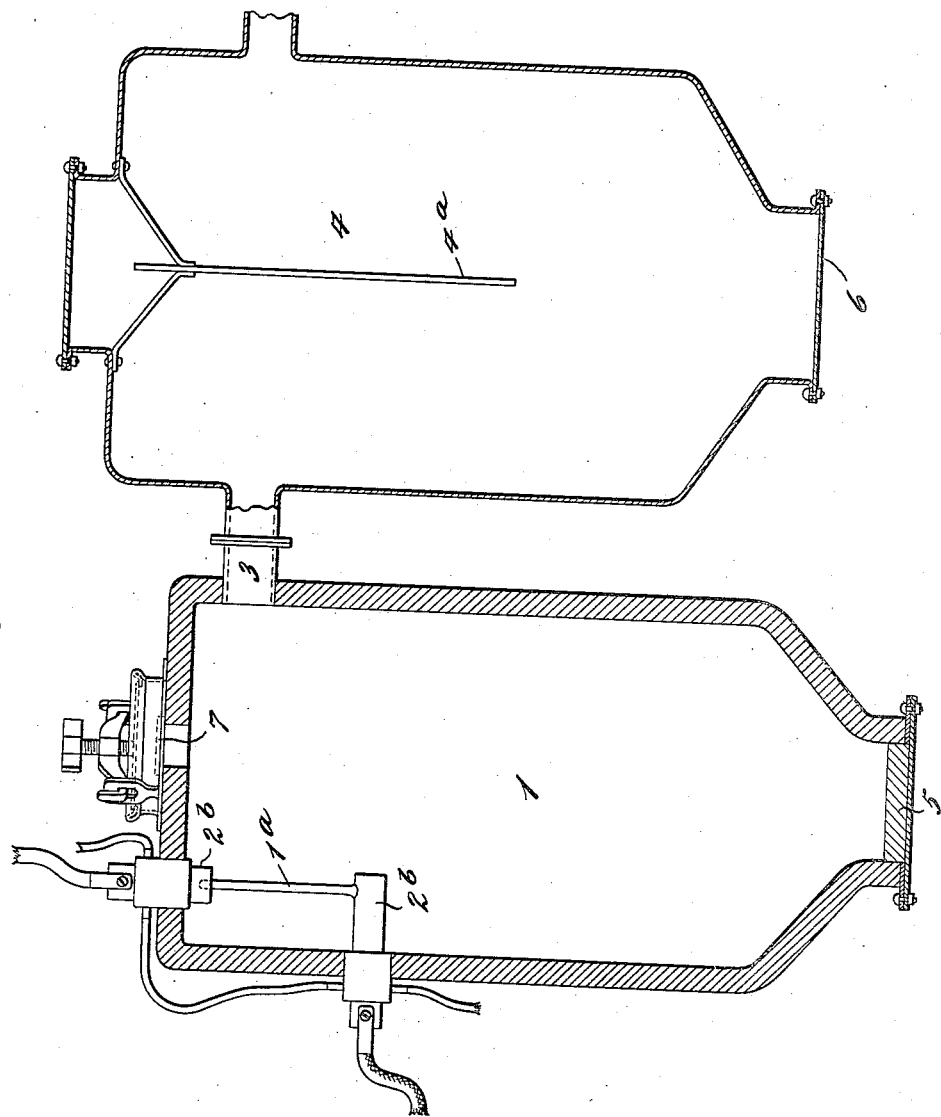

L. BURGESS.
PROCESS FOR PRODUCING ALUMINUM CHLORID.
APPLICATION FILED JAN. 3, 1919.

1,321,281.

Patented Nov. 11, 1919.
2 SHEETS—SHEET 1.

WITNESS:

INVENTOR.
Louis Burgess
BY
his ATTORNEY.

L. BURGESS.
PROCESS FOR PRODUCING ALUMINUM CHLORID.
APPLICATION FILED JAN. 3, 1919.
1,321,281.
Patented Nov. 11, 1919.
2 SHEETS—SHEET 2.
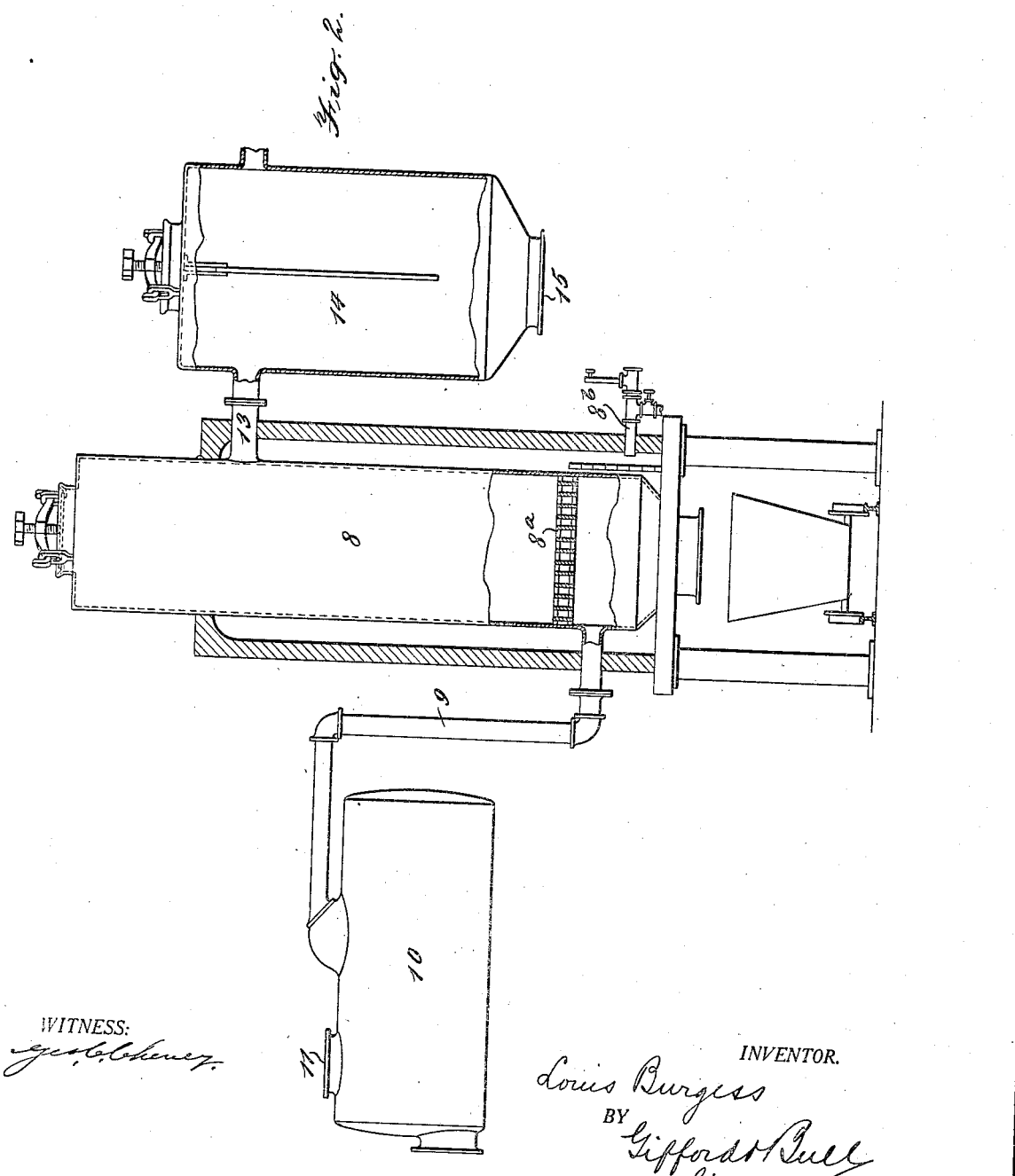

UNITED STATES PATENT OFFICE.

LOUIS BURGESS, OF NEW YORK, N. Y., ASSIGNOR TO STANDARD OIL COMPANY, A CORPORATION OF NEW JERSEY.

PROCESS FOR PRODUCING ALUMINUM CHLORID.

1,321,281.     Specification of Letters Patent.      Patented Nov. 11, 1919.

Application filed January 3, 1919. Serial No. 269,415.

*To all whom it may concern:*

Be it known that I, LOUIS BURGESS, a citizen of the United States, residing at New York city, in the county of New York and State of New York, have invented a certain new and useful Improvement in Processes for Producing Aluminum Chlorid, of which the following is a specification.

My invention relates to new and useful improvements in processes for the production of aluminum chlorid, and particularly contemplates the production of anhydrous aluminum chlorid by reacting upon aluminum carbid with a chlorid of an element below aluminum in the electro-chemical scale in relation to the affinity for chlorin.

Figure 1 illustrates a form of apparatus in which the process may be performed, and Fig. 2 illustrates a form of apparatus used in a modification of the process.

I have discovered that anhydrous aluminum chlorid ($AlCl_3$) can be produced by reacting upon aluminum carbid ($Al_4C_3$) with chlorids of elements below aluminum in the electro-chemical scale in relation to the affinity for chlorin, the result of the reaction being the production of anhydrous aluminum chlorid.

The chlorids used can, for example, be the following: tin chlorids ($SnCl_4$ and $SnCl_2$), zinc chlorid ($ZnCl_2$), bismuth chlorid ($BiCl_3$), both of the chlorids of mercury ($HgCl_2$ and $HgCl$), cadmium chlorid ($CdCl_2$), the lead chlorids ($PbCl$, $PbCl_2$), and cupric and cuprous chlorid ($CuCl$ and $CuCl_2$).

From a chemical standpoint, I have demonstrated that any one of the above chlorids can be used to react upon aluminum carbid to produce anhydrous aluminum chlorid, and I do not limit myself to any particular chlorid of the class mentioned, as the invention contemplates the employment of any chlorid in which the electro-positive element is below aluminum in the electro-chemical scale in relation to its affinity for chlorin.

The element with which the chlorin is combined in the form of a chlorid, and the carbon which is combined with the aluminum in the form of a carbid, are ordinarily left behind in a free condition, but I do not wish to be limited in this respect, as these elements in some cases enter into combinations, thus, if aluminum carbid and a chlorid of sulfur be employed under certain conditions sulfids of carbon may result, together with the chlorid of aluminum.

In describing my invention in detail so that it may be understood by those skilled in the art, I will describe it, by way of example, as being carried out by reacting upon aluminum carbid ($Al_4C_3$) with lead chlorid ($PbCl_2$) only. The description with reference to lead chlorid will apply to those chlorids whose temperature of boiling or sublimation is above the kindling temperature at which they react with aluminum carbid to form anhydrous aluminum chlorid, as I have found that all such chlorids behave in substantially the same manner when caused to react upon aluminum carbid in accordance with my invention. In other words, the description with reference to lead chlorid will apply with equal force to any other chlorid which can be caused to react with aluminum carbid in a solid or fused condition, as distinguished from those chlorids which are volatile or gaseous at the kindling temperature of the reaction.

I will describe the reaction between aluminum carbid and lead chlorid in connection with one form of apparatus adapted for the purpose, the same being shown in Fig. 1 of the annexed drawings. In this connection, however, I do not desire to limit myself to the apparatus shown in Fig. 1, or to any specific form of apparatus, as the reaction may be carried out in any form of apparatus that is suited. In a suitable chamber, for example, a retort 1, I place a suitable mixture of aluminum carbid ($Al_4C_3$) and a suitable chlorid of the character above mentioned, for example, lead chlorid ($PbCl_2$). These substances are preferably mixed in such proportions by weight, that the chlorin content of the chlorid employed, and the aluminum content of the carbid employed, occur in the combining proportions in which they are present in the anhydrous chlorid of aluminum. I do not limit myself to the use of a mixture in the exact proportions mentioned, but preferably employ these proportions as being the most efficient and economical. I have produced the aluminum chlorid by employing lead chlorid and aluminum carbid in the proportions of 16.68 grams of lead chlorid and 2 grams of aluminum carbid, the latter analyzing about 75 per cent. $Al_4C_3$. The aluminum carbid is preferably ground so as to pass through a sieve of eight meshes to the inch, or finer, and the lead chlorid is in the granular or powder form so as to insure a thorough mixture of the two substances, and to result in a complete reaction throughout the entire mass of the mixture.

The reaction between the aluminum carbid and the lead chlorid is initiated in any suitable manner, for example, by an application of heat to the mixture, which may be done in any suitable manner, for example, by the use of a resistance element such as a carbon pencil $1^a$ embedded in the mixture, preferably near the top thereof, and adapted to be heated by an electric current from electrodes $2^b$. The exothermic reaction will be initiated when the mixture is heated to about 380° C., but this temperature may vary with the different chlorids used. 380° C. will initiate the reaction between aluminum carbid and lead chlorid; some of the other chlorids named require a somewhat higher temperature. These temperatures need not be stated in each instance, because those skilled in the art will understand that the temperature should be sufficient to initiate the reaction. I have found that this temperature will vary for the different chlorids anywhere from 200° C. to 700° C.

When the mixture of aluminum carbid and lead chlorid has been heated sufficiently to result in a reaction at any point, the reaction proceeds vigorously and spreads throughout the mass, at times with incandescence. The chlorin content of the lead chlorid will combine with the aluminum content of the aluminum carbid, thereby producing anhydrous aluminum chlorid ($AlCl_3$) in volatile form, which can be carried off from the retort through an outlet pipe 3 and conveyed to a suitable condenser or battery of condensers 4, preferably provided with a baffle $4^a$, where the aluminum chlorid will become condensed. As by-products of the reaction described, will be found metallic lead admixed with carbon remaining in the retort 1. Said by-products may be removed from the retort 1 through a bottom trap-door 5 and each of the condensers may be provided with a trap-bottom 6 to permit removal of the condensed anhydrous aluminum chlorid. It will be understood that the retort 1 may be provided with a top cover and seal 7 for charging the mixture of aluminum carbid and the chlorid into the retort.

The above procedure may be followed in carrying out the invention, employing any of the chlorids of the class heretofore mentioned in which the electro-positive element is lower than aluminum in the electro-chemical scale in relation to its affinity for chlorin, and in which the temperature of boiling or sublimation is above the kindling temperature at which such chlorid reacts with aluminum carbid to form anhydrous aluminum chlorid, for example, tin chlorid, cadmium chlorid, bismuth chlorid, mercury chlorids, lead chlorids and the copper chlorids. In all of these cases the chlorid and aluminum carbid are mixed preferably in the combining proportions, as described with reference to lead chlorid, and the reaction is initiated by an application of heat to some part of the mixture. In all cases the anhydrous aluminum chlorid is volatilized and may be carried off and condensed.

I have described above my invention in so far as it comtemplates the employment of chlorids in admixture with aluminum carbid, or in which the said compounds are in actual contact in a solid form. The invention also contemplates the performance of the reaction by employing chlorids which are volatile at the kindling temperatures at which the reaction between the chlorid and aluminum carbid takes place or is initiated, for example, boron chlorid ($BCl_3$), phosphorus trichlorid ($PCl_3$), silicon chlorid ($SiCl_4$) and the chlorids of sulfur. In employing these chlorids which are volatile at the temperature at which their reaction with aluminum carbid takes place, I prefer to volatilize the said chlorids and pass the volatile product in contact with aluminum carbid. In Fig. 2 of the annexed drawings, I have shown an apparatus for carrying out this aspect of the invention, although I do not limit myself thereto. In Fig. 2, 8 designates a retort in which is placed the aluminum carbid, preferably ground to the mesh heretofore described, and said retort is connected by an inlet duct 9 with a receptacle or pot 10, having a suitable cover 11 and adapted to receive the boron chlorid, silicon chlorid, chlorid of phosphorus, or chlorids of sulfur. This pot is heated in any suitable manner (not shown) to a temperature sufficient to volatilize the chlorid contained therein. The temperatures below 100° C. will be sufficient to volatilize many of the chlorids of this class. The volatilized chlorid vapor is conducted to the retort 8 through the duct 9 and delivered in the retort preferably at a point adjacent the lower portion of the body of the aluminum carbid, so as to pass upward through the latter and be disseminated throughout the carbid. The aluminum carbid is preferably supported on a grid $8^a$. The heated volatile products pass into the retort, and the reaction may be initiated by a carbon pencil, but preferably by external heating, for example, gas burner $8^b$, whereupon, the reaction takes place resulting in the formation of volatile anhydrous aluminum chlorid which passes from the retort 8 through the duct 13 into a suitable condenser or condensers 14, where the anhydrous aluminum chlorid sublimes, and may be recovered and withdrawn from the condenser through the bottom trap 15. In case of the chlorid of phosphorus, the phosphorus will be volatilized and pass over into the condensers with the aluminum chlorid, from which it may be separated by a fractional sublimation, but in the case of the silicon chlorid and the boron chlorid, the product of the reaction will be found admixed with carbon in the retort, and the volatile anhydrous aluminum chlorid will pass to the condensers as heretofore stated.

What I claim and desire to secure by Letters Patent of the United States, is:—

1. A process of producing anhydrous aluminum chlorid, which consists in contacting aluminum carbid with a chlorid of an element below aluminum in the electro-chemical scale in relation to the affinity for chlorin, under conditions suited to initiating a reaction between the same.

2. A process of producing anhydrous aluminum chlorid, which consists in contacting aluminum carbid with a chlorid of an element below aluminum in the electro-chemical scale in relation to the affinity for chlorin, and initiating a reaction between the same by subjecting the same or some part thereof to heat.

3. A process of producing anhydrous aluminum chlorid, which consists in contacting aluminum carbid with a chlorid of an element below aluminum in the electro-chemical scale in relation to the affinity for chlorin, initiating a reaction between the same, and condensing the volatile anhydrous aluminum chlorid resulting from the reaction.

4. A process of producing anhydrous aluminum chlorid, which consists in contacting a volatilized chlorid of an element below aluminum in the electro-chemical scale in relation to the affinity for chlorin, with aluminum carbid under conditions suited to initiating a reaction between the same.

5. A process of producing anhydrous aluminum chlorid, which consists in contacting a volatilized chlorid of an element below aluminum in the electro-chemical scale in relation to the affinity for chlorin with aluminum carbid, and initiating a reaction between the same by an application of heat.

6. A process of producing anhydrous aluminum chlorid, which consists in contacting aluminum carbid with a chlorid of an element below aluminum in the electro-chemical scale in relation to the affinity for chlorin, under conditions suited to initiating a reaction between the same, said carbid and chlorid being used in the proportion of their combining weights.

7. A process of producing anhydrous aluminum chlorid, which consists in contacting aluminum carbid with a chlorid of an element below aluminum in the electro-chemical scale in relation to the affinity for chlorin, and causing a reaction between the same.

In testimony whereof I have hereunto signed my name in the presence of two subscribing witnesses.

LOUIS BURGESS.

Witnesses:
C. G. HEYLMUN,
AGNES CUNNEEN.